United States Patent [19]

Sarma

[11] Patent Number: 5,471,330
[45] Date of Patent: Nov. 28, 1995

[54] POLYSILICON PIXEL ELECTRODE

[75] Inventor: Kalluri R. Sarma, Mesa, Ariz.

[73] Assignee: Honeywell Inc., Minneapolis, Minn.

[21] Appl. No.: 99,961

[22] Filed: Jul. 29, 1993

[51] Int. Cl.$^6$ .................. G02F 1/1343; H01L 21/26; H01L 21/469
[52] U.S. Cl. .................. 359/59; 359/87; 257/59; 257/72; 437/173; 437/233
[58] Field of Search .................. 257/59, 72; 359/59, 359/87; 437/233, 173

[56] References Cited

U.S. PATENT DOCUMENTS

| | | | |
|---|---|---|---|
| 5,051,800 | 9/1991 | Shoji et al. | 359/59 |
| 5,132,820 | 7/1992 | Someya et al. | 359/87 |
| 5,242,859 | 9/1993 | Degelormo et al. | 437/165 |
| 5,245,452 | 9/1993 | Nakamura et al. | 359/59 |
| 5,248,630 | 9/1993 | Serikawa et al. | 437/101 |
| 5,366,926 | 11/1994 | Mei et al. | 437/173 |

FOREIGN PATENT DOCUMENTS

| | | | |
|---|---|---|---|
| 0236629A2 | 9/1987 | European Pat. Off. | |
| 0348209A2 | 12/1989 | European Pat. Off. | |
| 4-88643 | 3/1992 | Japan | 437/233 |
| 2219136 | 11/1989 | United Kingdom | 359/59 |

OTHER PUBLICATIONS

Shimizu et al., "On–Chip Bottom–Gate Polysilicon and Amorphous Silicon Thin–Film Transistors Using Excimer Laser Annealing", Japanese Journal of Applied Physics, vol. 29, No. 10, Oct. 1990, pp. L1775–L1777.

A. Yamamoto et al., "A⅔ Inch Fully Integrated Active–Matrix LCD with Thin Mesh Polysilicon Electrodes", 1989, pp. 7.2.1–7.2.4 *IEDM Technical Digest* of IEEE.

G. Lubberts et al., "Optical Properties of Phosphorus–Doped Polycrystalline Silicon Layers", Nov. 1981, pp. 6870–6878 *Journal of Applied Physics* 52(11).

Abstract—JP 1241862 (Sony), Sep. 26, 1989, *Patent Abstracts of Japan*, vol. 13, No. 578 (E–864).

*Primary Examiner*—Anita Pellman Gross
*Assistant Examiner*—Walter J. Malinowski
*Attorney, Agent, or Firm*—John G. Shudy, Jr.

[57] ABSTRACT

A liquid crystal display wherein each pixel has a thin film transistor with a silicon pixel electrode. A doping and recrystallization of the silicon is effected to increase the electrical conductivity and light transmittance of the silicon adequately for the pixel electrode.

16 Claims, 4 Drawing Sheets

POLYSILICON PIXEL ELECTRODE

BACKGROUND OF THE INVENTION

This invention pertains to active matrix liquid crystal displays and particularly to display pixels. More particularly, the invention pertains to pixel electrodes of displays.

Active matrix liquid crystal displays (AMLCDs) are being used as a replacement for cathode ray tubes (CRTs) in a number of select applications, as well as in new applications such as laptop and note-book personal computers (PCs) wherein CRTs were not even considered due to their bulky size, excessive weight, and high power consumption. However, the use of AMLCDs is limited by the high cost of these displays due to complex fabrication processes used and the low yields achieved. Amorphous silicon (a-Si) thin film transistors (TFTs) are most widely used in the active matrix array for the fabrication of AMLCDs, because of their low temperature processing feature and large area capability.

Indium tin oxide (ITO) is used as a transparent pixel electrode in the fabrication of AMLCDs. While ITO material has good transmission and electrical conductivity, it complicates the active matrix substrate processing. Some of the thin films used in the fabrication of a-Si TFTs are not completely compatible with the ITO pixel electrode layer with respect to processing temperatures and adhesion properties. This incompatibility requires trade-offs in design and fabrication that affect process complexity, display performance and cost.

FIGS. 1a and 1b illustrate the conventional design of a typical a-Si TFT and pixel having ITO as a pixel electrode material. FIG. 1a shows the cross-sectional view and FIG. 1b shows the plan view. Even though there may be variations in details among the different processes used, a typical a-Si TFT active matrix substrate fabrication involves the following steps: 1) deposit, pattern and etch the gate metal layer 11 such as chromium on the display glass substrate 10; 2) deposit the gate dielectric layer such as silicon nitride 12; 3) deposit, pattern and etch undoped a-Si layer 13; 4) deposit dielectric masking layer 14 such as silicon dioxide; 5) pattern and etch layer 14 which defines the TFT channel length and serves as a mask for source and drain contact formation; 6) form source and drain contacts 15 by deposition of a thin (about 200 Angstroms), highly phosphorus doped a-Si ($n^+$a-Si) layer 15; 7) deposit a source-drain metal such as aluminum layer 16, and pattern and etch aluminum layer 16 and $n^+$a-Si layer 15; 8) deposit a passivation layer 17 such as silicon dioxide; 9) pattern and etch pixel contact vias 9 in layer 17; 10) deposit, pattern and etch ITO pixel electrode 18; and 11) deposit, pattern and etch a dark polyimide layer 19. This dark polyimide layer is electrically non-conducting and serves as a top light shield layer for the TFT. Gate metal layer 11 serves as a bottom light shield layer for the TFT.

The above related art process is complicated, and involves design and performance trade-offs due to the use of an ITO pixel electrode 18. For example, if ITO layer 18 simply were to be deposited on the aluminum source-drain metal 16 directly, without an intermediate passivation layer 17 having contact via 9, significant film stresses would occur and result in the peeling of the aluminum/ITO layers 16 and 18. Thus, the use of passivation layer 17 with contact via 9, though a process complication, minimizes the contact area of aluminum/ITO layers 16 and 18, and keeps the film stresses manageable.

SUMMARY OF THE INVENTION

The present invention is a new simplified active matrix TFT and pixel design and fabrication that does not require the use of an ITO layer for pixel electrode. The pixel electrode is fabricated from silicon that is specially treated.

The major feature of the invention, due to the elimination of ITO and incorporation of silicon for pixel electrodes, is simplified processing with fewer masking levels which results in higher yields and lower manufacturing costs compared to conventional related art processing of FIG. 1. Salient features of the pixel device are the incorporation of undoped a-Si for the TFT and doped polysilicon for the associated pixel electrode. Another feature of the invention is the planar structure of the pixel electrode, which eliminates liquid crystal alignment problems that result in disclinations. For instance, a non-planar pixel surface produced due to the needed contact via, in conventional ITO pixels, causes difficulties in achieving uniform rubbing of the liquid crystal alignment layer which results in the formation of disclinations near the steps. A further feature of the invention is an active matrix substrate processing that is completely compatible with the silicon integrated circuit processing through the elimination of the ITO layer fabrication step.

DESCRIPTION OF THE PREFERRED EMBODIMENT

Figure 1A:
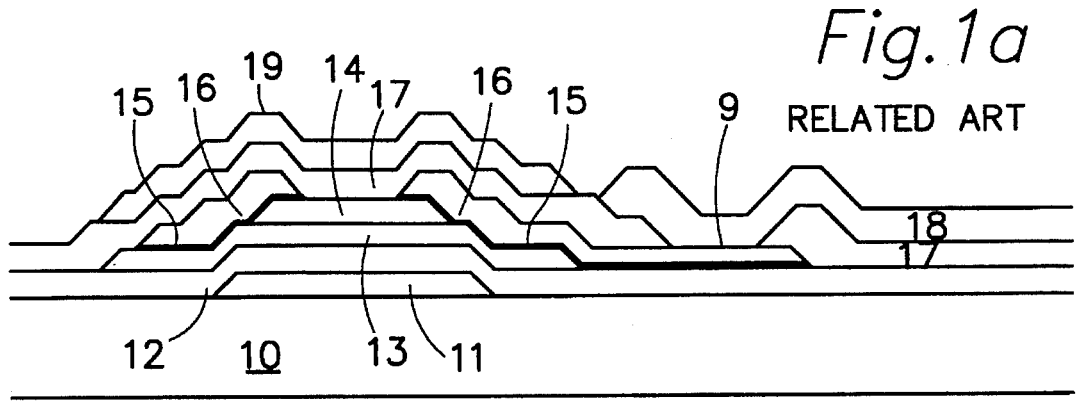
FIGS. 1a and 1b show a conventional ITO pixel electrode in conjunction with a TFT.
Figure 1B:
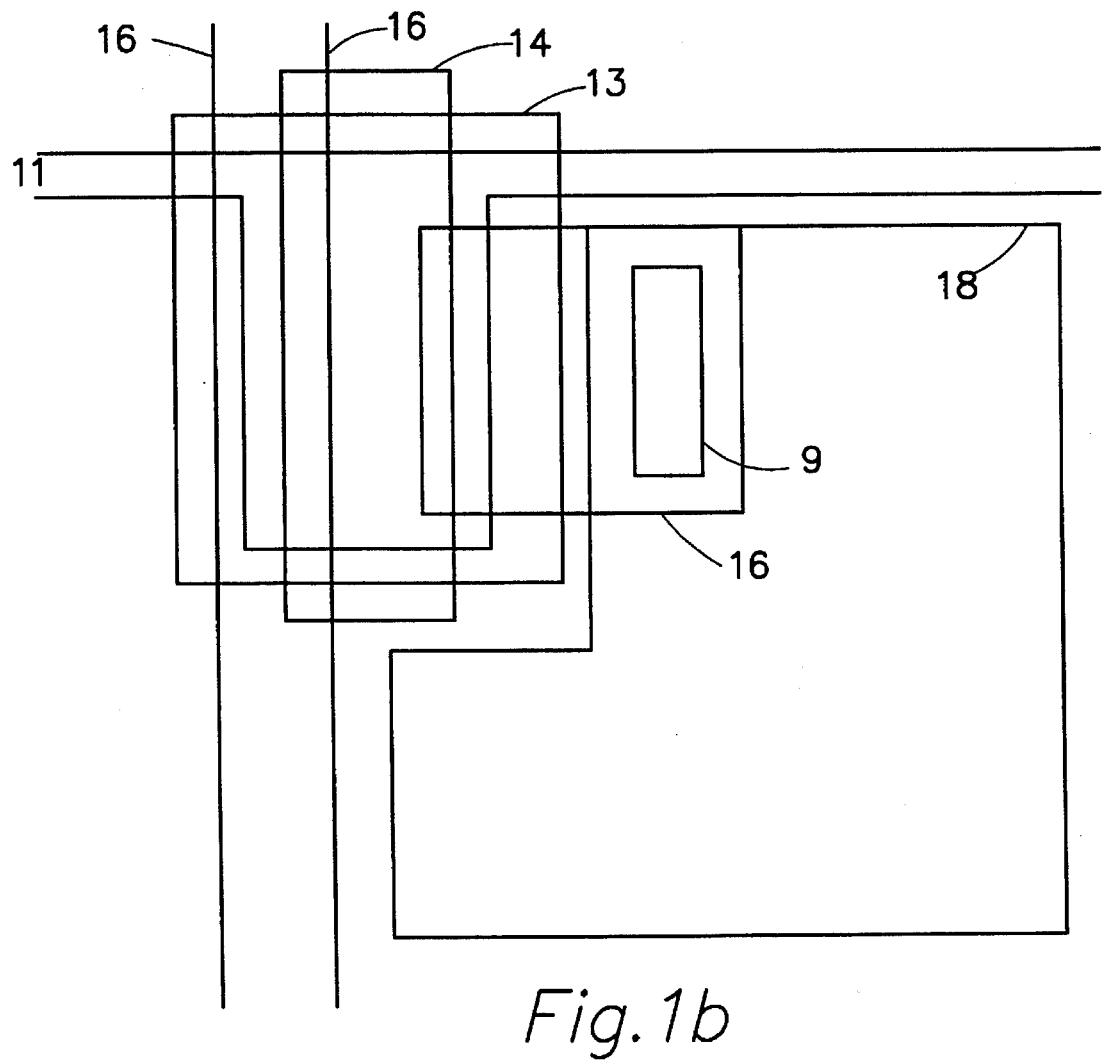

This invention describes a method of using a-Si film itself as a pixel electrode 23 in FIGS. 2 and 3 in lieu of the ITO used for pixel electrode 18 of FIG. 1. Undoped a-Si film as used in the TFT fabrication does not have adequate transmission in the visible region of the electromagnetic radiation spectrum or have the electrical conductivity required for a pixel electrode. However, when the a-Si film is highly doped and converted to large grain polysilicon, its electrical conductivity and light transmission can be increased dramatically. Such light transmission and electrical conductivity characteristics of highly doped, large grain polysilicon films is sufficient for use as a pixel electrodes in AMLCDs. This invention includes a method of selectively doping and recrystallizing the a-Si layer for use as a pixel electrode 23. This method of using a non-ITO pixel electrode simplifies the process of fabricating an a-Si TFT active matrix array.

The a-Si for pixel electrode 23 can be doped either during deposition by the plasma chemical vapor deposition by introducing a dopant gas such as phosphene ($PH_3$) or arsine ($AsH_3$), or by an ion implantation of a phosphorus or arsenic dopant species such as $P^{31}$ or $As^{75}$ into the film after deposition. The concentration to be achieved with this doping is $10^{19}$ to $3 \times 10^{20}$ atoms per $cm^3$. When this doped a-Si film is recrystallized for converting it to large grain polysilicon, its electrical conductivity and light transmittance increase enough for use as a pixel electrode. Implementation of an a-Si silicon electrode eliminates the need for passivation layer 17 and contact via 9 of FIG. 1a.

Figure 2A:
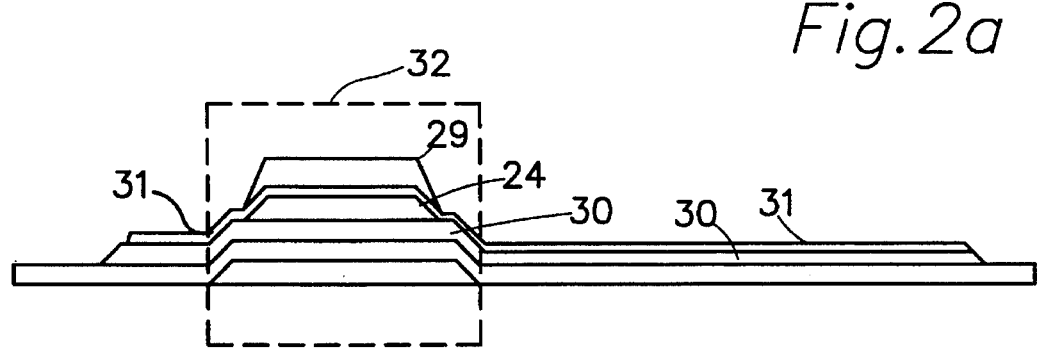
FIGS. 2a and 2b show the non-ITO pixel electrode in conjunction with a TFT at an intermediate stage of the active matrix substrate fabrication.
Figure 2B:
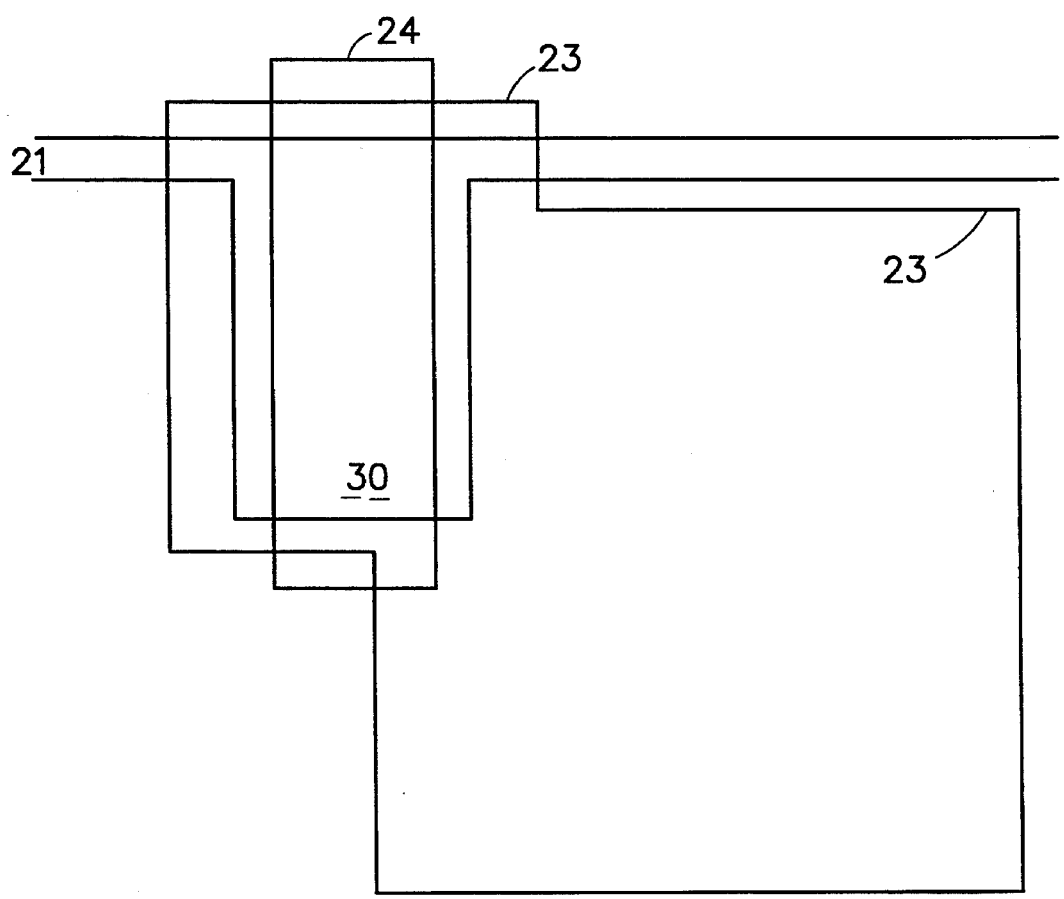

FIGS. 2a and 2b show the cross-sectional view and the plan view of the a-Si TFT 32 and the pixel at an intermediate stage of fabrication (prior to laser recrystallization).

Figure 3A:
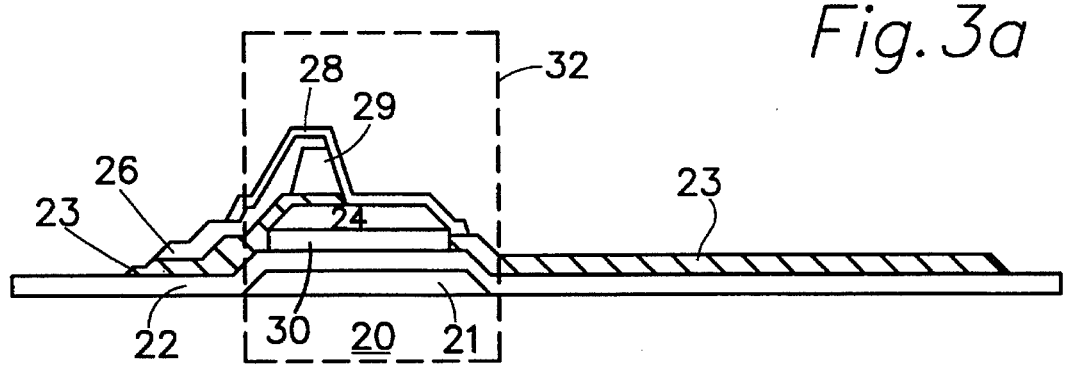
FIGS. 3a and 3b show a non-ITO pixel electrode in conjunction with a TFT.
Figure 3B:
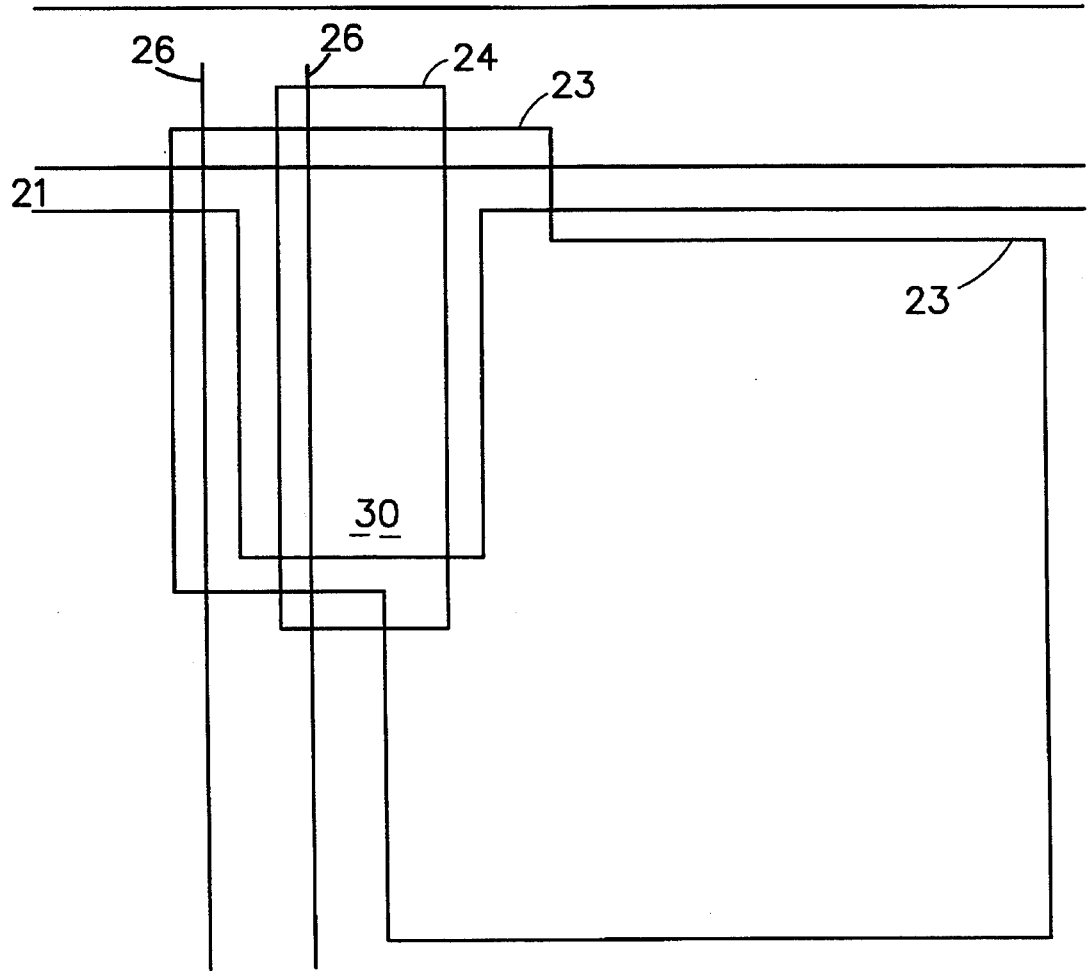

FIGS. 3a and 3b show the recrystallized silicon pixel electrode 23 and the associated a-Si TFT 32. FIG. 3a is the cross-sectional view and FIG. 3b is the plan view of the a-Si TFT 32 and the recrystallized silicon pixel 23.

Figure 4:
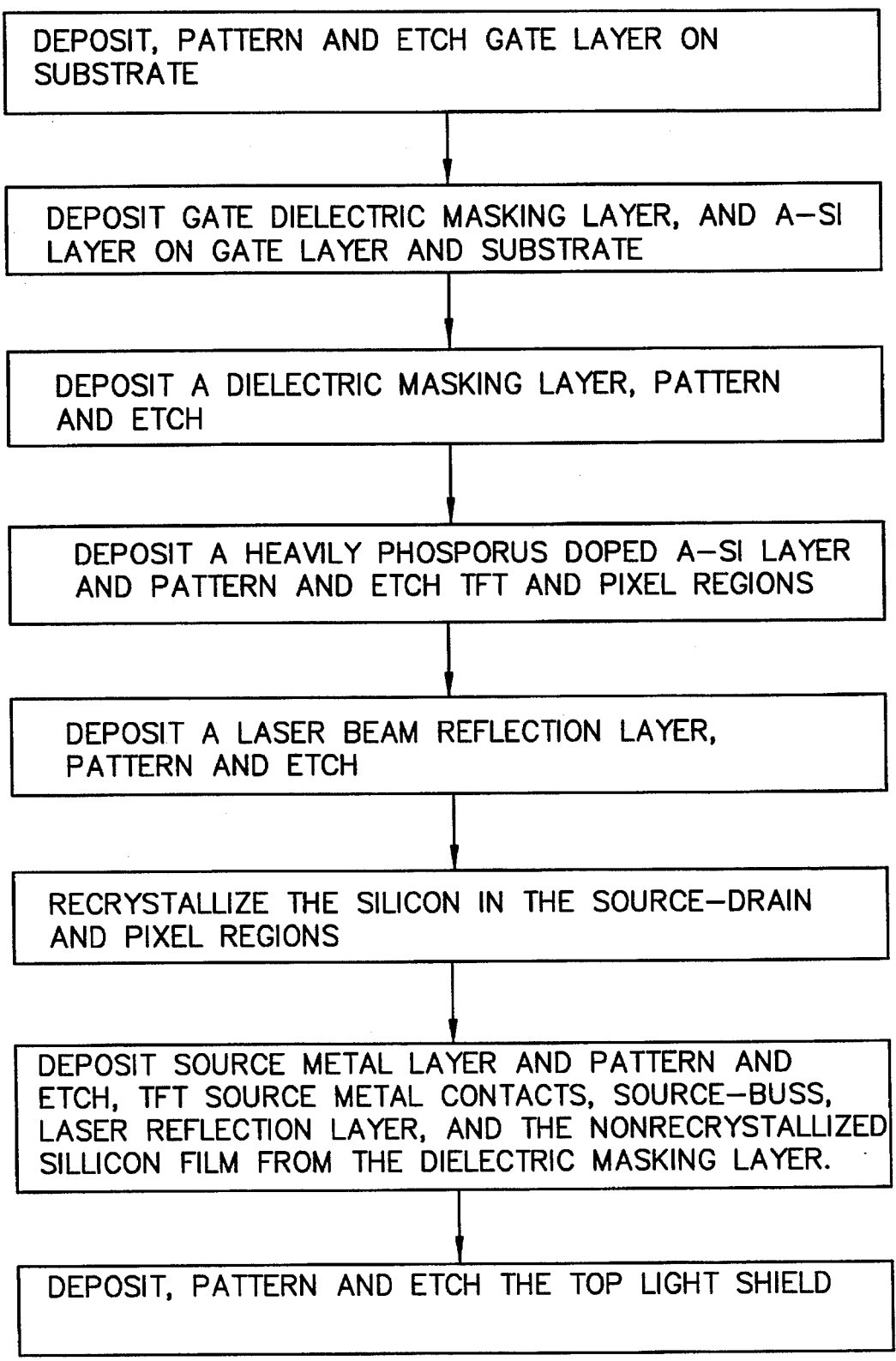
FIG. 4 is a diagram of the method for fabricating a non-ITO pixel electrode.

FIG. 4 summarily lists the sequence of fabrication steps for the present active matrix substrate having silicon pixel 23.

A sequence of fabrication steps for a device having a silicon pixel electrode are: 1) deposit, pattern and etch gate metal layer 21 such as chromium (or nichrome, aluminum, titanium, tantalum or a tantalum alloy) with a thickness of about 1200 Angstroms (an optional thickness may be between 1000 and 2000 Angstroms), on display glass substrate 20, which typically is low temperature glass but may be high temperature glass (wherein high temperature glass has a strain point greater than 600° C. and low temperature glass has a strain point less than 600° C.; examples of low temperature glass include CORNING glass, such as type 7059, and HOYA type NA40 glass); 2) deposit gate dielectric layer 22 such as silicon nitride (or tantalum pentoxide or silicon dioxide), with a thickness of about 2500 Angstroms (or another thickness between 1500 and 3000 Angstroms), on gate layer 21 and glass substrate 20; 3) deposit undoped a-Si layer 30 with a thickness of about 1000 Angstroms (but could be a another thickness between 500 and 2500 Angstroms) for TFT 32 and the pixel electrode; 4) deposit and etch dielectric masking layer 24 such as silicon dioxide (which could be silicon nitride instead), with a thickness of about 5000 Angstroms (or another thickness between 4000 and 6000 Angstroms) on layer 30 (layer 24 defines the TFT channel length by serving as a mask for source-drain contacts 26); 5) deposit a highly phosphorus doped a-Si ($n^+$ a-Si) layer 31 of about 250 Angstroms (or another thickness between 150 and 500 Angstroms), and pattern and etch the TFT channel area 32 and pixel area 31 to separate the pixels from one another; 6) deposit an aluminum reflective layer 29 of about 2500 Angstroms (or another thickness between 1500 and 5000 Angstroms) over the pixel device area (the role of aluminum reflective layer 29 is to serve as a reflector for the laser energy during the subsequent recrystallization step 8); 7) pattern and etch aluminum reflective layer 29 to restrict its coverage over remaining layer 24; 8) recrystallize a-Si layers 31 and 30 using a pulsed XeCl excimer laser. (While exposed area 31, including the source-drain contacts 26, and display pixel 30 will be melted and recrystallized into a highly doped, large grain polysilicon layer 23, the undoped a-Si layer 30 in the TFT channel region underneath the aluminum reflector layer 29 is unaffected because the aluminum reflects the laser energy away from TFT channel region 32. The XeCl excimer laser has a wavelength of 3080 Angstroms and is efficiently absorbed by a-Si, and under an essentially adiabatic processing mode, it results in melting and recrystallization of a-Si to polysilicon. The XeCl laser is pulsed with a pulse duration of about 50 nanoseconds and an energy density of about 300 mJ/Cm². These laser recrystallization parameters are designed to melt and recrystallize a-Si layers 30 and 31 into polysilicon layer 23 without affecting low temperature display glass substrate 20. Laser melting homogenizes the phosphorus doping of layer 31 into the undoped a-Si layer 30, thereby resulting in a uniform heavily phosphorus doped recrystallized polysilicon layer 23. The laser beam used in laser melting has a typical cross-sectional size of about 1 centimeter (cm) by 1 cm, with a uniform energy distribution. A typical laser pulse repetition rate is about 50 Hz, but only one pulse is needed for the crystallization of a pixel electrode area covered by the laser beam. The beam is scanned across the area of the active matrix substrate to recrystallize all of the pixels of the entire substrate.) 9) Deposit source metal layer 26 such as aluminum or molybdenum with a thickness of about 6000 Angstroms (or another thickness between 4000 and 8000 Angstroms), and pattern and etch the aluminum and the a-Si layers. (The etching process results in forming aluminum or molybdenum source contact 26 and source bus 26 for the display and also removes the part of aluminum reflector layer 29 which is not directly underneath source metal 26. The a-Si etching completely removes $n^+$a-Si layer 31 on dielectric masking layer 24, and partially removes recrystallized layer 23 in the pixel region. This silicon etching step can be used to control the thickness of silicon pixel layer 23 to a desired value.) 10) Deposit a dark polyimide layer 28 on the pixel device, and pattern and etch so that layer 28 remains only on the TFT 32 area. (The dark layer 28 material may be doped with a dark dye or soot to make it opaque. Layer 28 is electrically non-conducting and serves as a top light shield layer for TFT 32. Gate metal layer 21 serves as a bottom light shield layer for TFT 32.)

The active matrix substrate as fabricated according to the above steps, is used in the assembly of the AMLCD, including color versions, using conventional liquid crystal display manufacturing techniques.

Many variations of the processes described above are possible. For example, the a-Si film can be recrystallized into polysilicon in the solid phase by using rapid thermal annealing techniques that use radiant heating lamps such as a bank of tungsten-halogen lamps in lieu of the XeCl excimer laser. Also, Gas Immersion Laser Doping (GILD) can be utilized with the excimer laser pulse, to simultaneously dope and recrystallize the silicon pixel electrode. GILD process involves introducing a dopant gas such as $PH_3$ or $AsH_3$ into the recrystallization ambient within a chamber, on molten silicon film layer 30, to dope the film with phosphorus.

The embodiments of the invention in which an exclusive property or right is claimed are defined as follows:

1. A liquid crystal display pixel comprising:

a glass substrate;

a metal gate layer formed on a first portion of said glass substrate;

a gate dielectric layer formed on said metal gate layer and on a second portion of said glass substrate;

an amorphous silicon channel layer formed on a first portion of said gate dielectric layer and located proximate to said metal gate layer;

a polysilicon source layer formed adjacent to said amorphous silicon channel layer;

a polysilicon drain layer formed adjacent to said amorphous silicon channel layer; and a polysilicon pixel electrode layer formed on a second portion of said gate dielectric layer.

2. A method for fabricating a silicon pixel electrode for a liquid crystal display, comprising:

forming a gate metal layer on a first portion of a glass substrate;

forming a gate dielectric layer on the gate metal layer and on a second portion of the glass substrate;

forming an amorphous silicon channel layer on a first portion of the gate dielectric layer and located proximate to the gate metal layer;

forming a polysilicon source layer adjacent to said amorphous silicon channel layer;

forming a polysilicon drain layer adjacent to said amorphous silicon channel layer; and forming a polysilicon pixel electrode layer on a second portion of the gate dielectric layer.

3. A method for fabricating a silicon pixel electrode for a liquid crystal display, comprising:

depositing and etching a gate metal layer on a display glass substrate;

depositing a gate dielectric layer on the gate metal layer and glass substrate;

depositing an undoped a-Si layer for the silicon pixel electrode and a TFT, on the gate dielectric layer;

depositing and etching a dielectric masking layer on the undoped a-Si layer;

depositing a doped a-Si layer on the undoped a-Si layer and the dielectric masking layer;

etching the doped and undoped a-Si layers to define the TFT region and the pixel region;

depositing a reflective metal layer on the doped a-Si layer;

etching the reflective metal layer for coverage over the dielectric masking layer;

recrystallizing a portion of the doped and undoped a-Si layers into a doped polysilicon layer;

depositing a source metal layer on a portion of the doped polysilicon layer;

etching a portion of the metal reflective layer;

depositing a dark polyimide layer over the source metal layer, the dielectric masking layer and the doped polysilicon layer; and etching the dark polyimide layer from the polysilicon layer in the pixel region.

4. The method of claim 3 wherein:

the gate metal layer is a material selected from a group consisting of chromium, nichrome, aluminum, titanium, tantalum and tantalum alloys;

the gate dielectric layer is a material selected from a group consisting of silicon nitride, tantalum pentoxide and silicon dioxide; and the dielectric masking layer is a material selected from a group consisting of silicon dioxide and silicon nitride.

5. The method of claim 4 wherein the recrystallization of the doped and undoped a-Si layers into the doped polysilicon layer is accomplished by melting the a-Si layers with a laser.

6. The method of claim 4 wherein the recrystallization of the doped and undoped layers into a doped polysilicon layer is accomplished by heating the a-Si layers with radiant heating lamps.

7. The method of claim 4 wherein the glass substrate is a low temperature glass.

8. The method of claim 7 wherein:

the gate metal layer has a thickness between 1000 and 2000 Angstroms;

the gate dielectric layer has a thickness between 1500 and 3000 Angstroms;

the undoped a-Si layer has a thickness between 500 and 2500 Angstroms;

the dielectric masking layer has a thickness between 4000 and 6000 Angstroms;

the doped a-Si layer has a thickness between 150 and 500 Angstroms;

the reflective metal layer has a thickness between 1500 and 3000 Angstroms; and the source metal layer has a thickness between 4000 and 8000 Angstroms.

9. A method for fabricating a silicon pixel electrode having a pixel area for a liquid crystal display, comprising:

depositing and etching a gate metal layer on a display glass substrate;

depositing a gate dielectric layer on the gate metal layer and the glass substrate;

depositing an undoped a-Si layer for the silicon pixel electrode and a TFT, on the gate dielectric layer;

depositing and etching a dielectric masking layer on the undoped a-Si layer covering a channel area of the TFT;

depositing and etching a reflective metal layer on the dielectric masking layer to protect the channel area of the TFT;

doping and recrystallizing, approximately simultaneously, a portion of the undoped a-Si layer into a doped polysilicon layer;

depositing a source metal layer on a portion of the doped polysilicon layer;

etching away a portion of the reflective metal layer;

depositing a dark polyimide on the source metal layer, dielectric masking layer and doped polysilicon layer; and etching the dark polyimide layer from the polysilicon layer in the pixel area.

10. The method for fabricating a silicon pixel electrode of claim 9, wherein the doping and recrystallizing comprises:

heating the portion of the undoped a-Si layer into molten silicon, with a pulse of laser light; and exposing the molten silicon to a dopant gas to dope the molten silicon.

11. The method for fabricating a silicon pixel electrode of claim 10, wherein:

the laser light is from an excimer laser; and the dopant gas is $PH_3$ or $AsH_3$ for doping the silicon with phosphorus or arsenic.

12. The method for fabricating a silicon pixel electrode of claim 9, wherein the doping of the undoped a-Si layer is effected by ion implantation of a phosphorus or arsenic dopant species into the a-Si layer with a concentration between $10^{19}$ and $3\times10^{20}$ atoms per cubic centimeter.

13. A liquid crystal display comprising a plurality of pixels on a glass substrate, wherein each pixel comprises:

a gate metal layer formed on a first portion of the glass substrate;

a gate dielectric layer formed on the gate metal layer and on a second portion of the glass substrate;

an a-Si layer formed on a first portion of the gate dielectric layer and proximate to the gate metal layer;

a doped polysilicon pixel electrode layer formed on a second portion of the gate dielectric layer;

a dielectric masking layer formed on the a-Si layer;

a polysilicon non-pixel electrode layer formed on a third portion of the gate dielectric layer;

a source metal layer formed on the polysilicon non-pixel electrode; and a dark polyimide layer formed on the dielectric masking layer and on the source metal layer.

14. The liquid crystal display of claim 13 wherein:

the glass substrate is a low temperature glass;

the gate metal layer has a thickness between 1000 and 2000 Angstroms;

the gate dielectric layer has a thickness between 1500 and 3000 Angstroms;

the a-Si layer has a thickness between 500 and 2500 Angstroms;

the polysilicon pixel electrode layer has a thickness between 650 and 3000 Angstroms;

the dielectric masking layer has a thickness between 4000 and 6000 Angstroms;

the polysilicon non-pixel electrode layer has a thickness between 650 and 3000 Angstroms; and the source metal layer has a thickness between 4000 and 8000 Angstroms.

15. A liquid crystal display pixel comprising:

a glass substrate;

a metal gate layer formed on a first portion of said glass substrate;

a gate dielectric layer formed on said metal gate layer and on a second portion of said glass substrate;

an amorphous silicon channel layer formed on a first portion of said gate dielectric layer and located proximate to said metal gate layer;

a polysilicon source layer formed adjacent to said amorphous silicon channel layer;

a polysilicon drain layer formed adjacent to said amorphous silicon channel layer; and a doped polysilicon pixel electrode layer formed on a second portion of said gate dielectric layer.

16. A method for fabricating a silicon pixel electrode for a liquid crystal display, comprising:

forming a gate metal layer on a first portion of a glass substrate;

forming a gate dielectric layer on the gate metal layer and on a second portion of the glass substrate;

forming an amorphous silicon channel layer on a first portion of the gate dielectric layer and located proximate to the gate metal layer;

forming a polysilicon source layer adjacent to Said amorphous silicon channel layer;

forming a polysilicon drain layer adjacent to said amorphous silicon channel layer; and forming a doped polysilicon pixel electrode layer on a second portion of the gate dielectric layer.

* * * * *

UNITED STATES PATENT AND TRADEMARK OFFICE
CERTIFICATE OF CORRECTION

PATENT NO. : 5,471,330
DATED : 11-28-95
INVENTOR(S) : KALLURI R. SARMA

It is certified that error appears in the above-indentified patent and that said Letters Patent is hereby corrected as shown below:

Column 8, Line 18, delete "Said" and replace with --said--.

Signed and Sealed this

Ninth Day of April, 1996

Attest:

BRUCE LEHMAN

*Attesting Officer*  Commissioner of Patents and Trademarks